US012718811B2

(12) United States Patent
Park et al.

(10) Patent No.: US 12,718,811 B2
(45) Date of Patent: Aug. 25, 2026

(54) ELECTRONIC DEVICES AND METHODS OF HANDLING USER UTTERANCES

(71) Applicant: SAMSUNG ELECTRONICS CO., LTD., Suwon-si (KR)

(72) Inventors: Sangmin Park, Suwon-si (KR); Gajin Song, Suwon-si (KR); Kyungtae Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 135 days.

(21) Appl. No.: 18/411,953

(22) Filed: Jan. 12, 2024

(65) Prior Publication Data

US 2024/0161744 A1 May 16, 2024

Related U.S. Application Data

(63) Continuation of application No. PCT/KR2023/012151, filed on Aug. 17, 2023.

(30) Foreign Application Priority Data

Aug. 19, 2022 (KR) ........................ 10-2022-0104203
Sep. 7, 2022 (KR) ........................ 10-2022-0113218

(51) Int. Cl.
*G10L 15/22* (2006.01)

(52) U.S. Cl.
CPC ........ *G10L 15/22* (2013.01); *G10L 2015/221* (2013.01); *G10L 2015/223* (2013.01)

(58) Field of Classification Search
CPC ............... G10L 15/22; G10L 2015/221; G10L 2015/223; G10L 15/1822; G06F 40/30; G06F 3/16
See application file for complete search history.

(56) References Cited

U.S. PATENT DOCUMENTS 11,302,311 B2 4/2022 Kim et al.
11,393,470 B2 7/2022 Kim
(Continued)

FOREIGN PATENT DOCUMENTS

JP 6852006 B2 3/2021
KR 10-2005-0082249 A 8/2005
(Continued)

OTHER PUBLICATIONS

International Search Report (PCT/ISA/210) issued by the International Searching Authority on Nov. 8, 2023 in International Application No. PCT/KR2023/012151.

*Primary Examiner* — Abul K Azad
(74) *Attorney, Agent, or Firm* — Sughrue Mion, PLLC

(57) ABSTRACT

An electronic device includes a memory storing instructions; and a processor electrically connected to the memory and configured to execute the instructions to: receive user utterance data; obtain an utterance-domain data set including candidate utterance data that is based on the user utterance data; generate transformed utterance data associated with the user utterance data based on a language model and the utterance-domain data set; and provide a response corresponding to the user utterance data, based on the transformed utterance data. The utterance-domain data set may include at least one candidate utterance data paired with each of a plurality of domains. Each domain of the plurality of domains corresponds to a different operation or function.

19 Claims, 9 Drawing Sheets

(56) References Cited

U.S. PATENT DOCUMENTS

| | | | | |
|---|---|---|---|---|
| 2005/0182628 | A1* | 8/2005 | Choi | G10L 15/08<br>704/252 |
| 2019/0164553 | A1* | 5/2019 | Leeb | G10L 15/02 |

FOREIGN PATENT DOCUMENTS

| | | | |
|---|---|---|---|
| KR | 10-1309042 | B1 | 9/2013 |
| KR | 10-2014-0028174 | A | 3/2014 |
| KR | 10-2018-0087942 | A | 8/2018 |
| KR | 10-2019-0121721 | A | 10/2019 |
| KR | 10-2020-0072005 | A | 6/2020 |
| KR | 10-2020-0092448 | A | 8/2020 |
| KR | 10-2236467 | B1 | 4/2021 |
| KR | 10-2281515 | B1 | 7/2021 |
| KR | 10-2022-0037187 | A | 3/2022 |

* cited by examiner

ELECTRONIC DEVICES AND METHODS OF HANDLING USER UTTERANCES

CROSS-REFERENCE TO RELATED APPLICATIONS

This application is a continuation of International Application No. PCT/KR2023/012151 designating the United States, filed on Aug. 17, 2023, in the Korean Intellectual Property Receiving Office and claiming priority to Korean Patent Application No. 10-2022-0104203 filed on Aug. 19, 2022, and Korean Patent Application No. 10-2022-0113218 filed on Sep. 7, 2022, in the Korean Intellectual Property Office, the disclosures of which are incorporated by reference herein in their entireties.

BACKGROUND

1. Field

The disclosure relates to an electronic device and method for processing user utterances.

2. Description of Related Art

An electronic device equipped with a voice assistant function providing a user's utterance-based service is provided in various ways. The electronic device may recognize a user's utterance via an artificial intelligence (AI) server and understand the meaning and intent of the utterance. The AI server may infer the user's intent by interpreting the user's utterance, and perform a task corresponding to the inferred intent. The AI server may perform the task according to the user's intent represented through a natural language interaction between the user and the AI server.

The electronic device equipped with the voice assistant function may perform, in a time-series manner, an operation of classifying a domain (e.g., an application) for processing a user's utterance and an operation of performing a task corresponding to the user's utterance in the classified domain. However, often times, a user's utterance may contain unrecognized words that may not be processed

SUMMARY

According to an aspect of the disclosure, an electronic device includes: a memory storing instructions; and a processor electrically connected to the memory and configured to execute the instructions to: receive user utterance data; obtain an utterance-domain data set including candidate utterance data that is based on the user utterance data; generate transformed utterance data associated with the user utterance data based on a language model and the utterance-domain data set; and provide a response corresponding to the user utterance data, based on the transformed utterance data, wherein the utterance-domain data set may include at least one candidate utterance data paired with each of a plurality of domains, and wherein each domain of the plurality of domains corresponds to a different operation or function.

According to an aspect of the disclosure, an operation method of an electronic device, includes: receiving user utterance data; obtaining an utterance-domain data set including candidate utterance data that is based on the user utterance data; generating transformed utterance data associated with the user utterance data based on a language model and the utterance-domain data set; and providing a response corresponding to the user utterance data based on the transformed utterance data, wherein the utterance-domain data set may include at least one candidate utterance data paired with each of a plurality of domains, and wherein each domain of the plurality of domains corresponding to a different operation or function.

The providing of the response may include: obtaining intent information based on information paired with the transformed utterance data; and performing the task corresponding to the intent information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
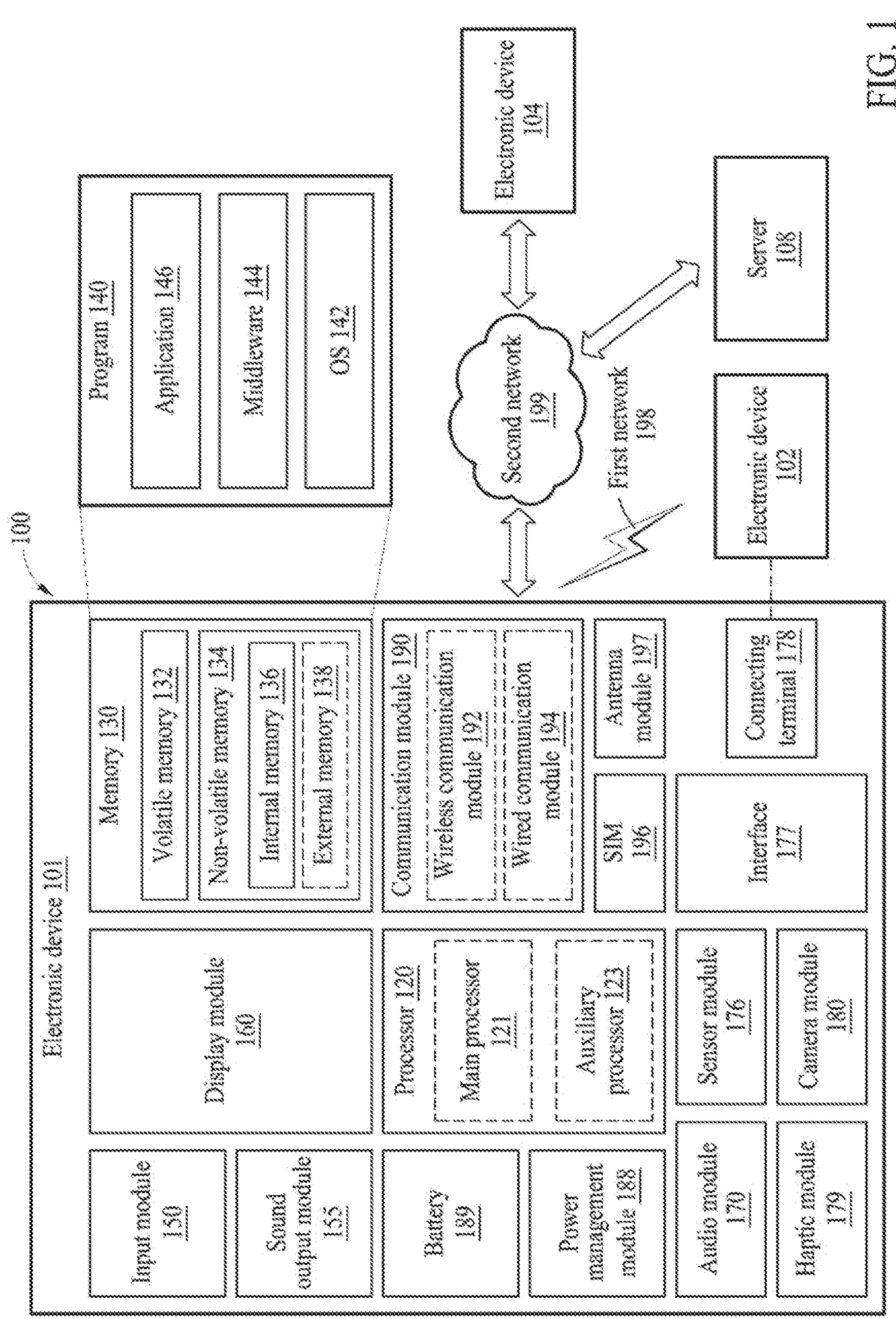
FIG. 1 is a block diagram illustrating an example electronic device in a network environment according to an example embodiment of the present disclosure.

Hereinafter, various example embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an example electronic device in a network environment according to an example embodiment of the disclosure. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the above components (e.g., the connecting terminal 178) may be omitted from the electronic device 101, or one or more other components may be added to the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence (AI) model processing. An AI model may be generated by machine learning. The machine learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry for controlling a corresponding one of the display, the hologram device, and the projector. According to an example embodiment, the display module 160 may include a touch sensor adapted to sense a touch, or a pressure sensor adapted to measure an intensity of a force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network such as a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, for example, a high data transmission rate. The wireless communication module 192 may support various technologies for securing performance on a high-frequency band, such as, for example, beamforming, massive multiple-input and multiple-output (MIMO), full dimensional MIMO (FD-MIMO), an antenna array, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component other than the radiating element (e.g., a radio frequency integrated circuit (RFIC)) may be additionally formed as a part of the antenna module 197.

According to various embodiments, the antenna module 197 may form a mmWave antenna module. According to an example embodiment, the mmWave antenna module may include a PCB, an RFIC on a first surface (e.g., a bottom surface) of the PCB, or adjacent to the first surface of the PCB and configured to support a designated high-frequency band (e.g., a mmWave band), and a plurality of antennas (e.g., an antenna array) disposed on a second surface (e.g., a top or a side surface) of the PCB, or adjacent to the second surface of the PCB and configured to transmit or receive signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 and 104) may be a device of the same type as or a different type from the electronic device 101. According to an example embodiment, some or all the operations to be executed by the electronic device 101 may be executed by one or more of the external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 101. The electronic device 101 may provide the result, with or without further processing of the result, as at least a part of a response to the request. To that end, cloud computing, distributed computing, mobile edge computing (MEC), or client-server computing technology may be used, for example. The electronic device 101 may provide ultra-low latency services using, for example, distributed computing or MEC. In one or more embodiments, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
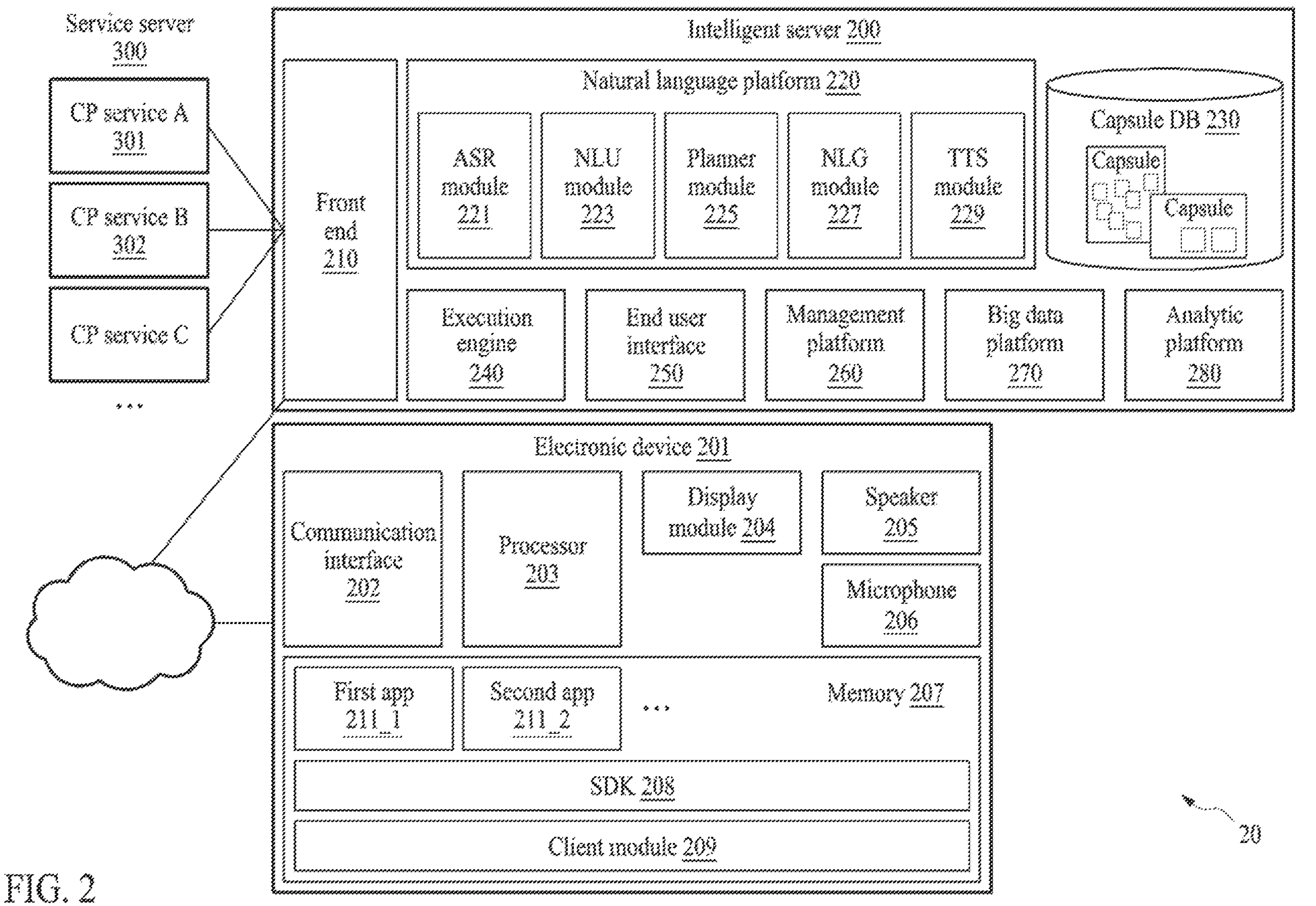
FIG. 2 is a block diagram illustrating an example integrated intelligent system according to an example embodiment of the present disclosure.

FIG. 2 is a block diagram illustrating an example integrated intelligent system according to an example embodiment of the present disclosure. Referring to FIG. 2, according to an example embodiment, an integrated intelligent system 20 may include an electronic device 201 (e.g., the electronic device 101 of FIG. 1), an intelligent server 200 (e.g., the server 108 of FIG. 1), and a service server 300 (e.g., the server 108 of FIG. 1).

The electronic device 201 may be a terminal device that is connectable to the Internet, for example, a mobile phone, a smartphone, a personal digital assistant (PDA), a laptop computer, a television (TV), a white home appliance, a wearable device (e.g., smart watch), a head-mounted display (HMD), or a smart speaker.

As illustrated in FIG. 2, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device to transmit and receive data to and from the external device. The microphone 206 may receive sound (e.g., an utterance from a user) and convert the sound into an electrical signal. The speaker 205 may output the electrical signal as sound (e.g., voice).

The display module 204 may display an image or video. The display module 204 may also display a graphical user interface (GUI) of an application (app), or an application program being executed. The display module 204 may receive a touch input through a touch sensor. For example, the display module 204 may receive a text input through the touch sensor in an on-screen keyboard area displayed on the display module 204.

The memory 207 may store therein a client module 209, a software development kit (SDK) 208, and a plurality of apps 211. The client module 209 and the SDK 208 may configure a framework (or a solution program) for performing general-purpose functions. Furthermore, the client module 209 or the SDK 208 may configure a framework for processing a user input (e.g., a voice input, a text input, and a touch input).

The apps 211 stored in the memory 207 may be programs for performing predetermined functions. The apps 211 may include a first app 211_1, a second app 211_2, or any other desired number of apps. The apps 211 may each include a plurality of actions for performing the predetermined functions. For example, the apps 211 may include an alarm app, a messaging app, and/or a scheduling app. The apps 211 may be executed by the processor 203 to sequentially execute at least a portion of the actions.

The processor 203 may control the overall operation of electronic device 201. For example, the processor 203 may be electrically connected to the communication interface 202, the microphone 206, the speaker 205, and the display module 204 to perform predetermined operations.

The processor 203 may also perform a predetermined function by executing a program stored in the memory 207. For example, the processor 203 may execute at least one of the client module 209 or the SDK 208 to perform the following operations for processing a user input. For example, the processor 203 may control the actions of the apps 211 through the SDK 208. The following operations described as operations of the client module 209 or the SDK 208 may be operations to be performed by the execution of the processor 203.

The client module 209 may receive a user input. For example, the client module 209 may receive a voice signal corresponding to a user's utterance sensed through the microphone 206. In one or more examples, the client module 209 may receive a touch input sensed through the display module 204. In one or more examples, the client module 209 may receive a text input sensed through a keyboard or an on-screen keyboard. The client module 209 may also receive, as non-limiting examples, various types of user inputs sensed through an input module included in the electronic device 201 or an input module connected to the electronic device 201. The client module 209 may transmit the received user input to the intelligent server 200. The client module 209 may transmit, to the intelligent server 200, state information of the electronic device 201 along with the received user input. The state information may be, for example, app execution state information indicating a state of execution of an app.

The client module 209 may also receive a result corresponding to the received user input. For example, when the intelligent server 200 is able to calculate the result corresponding to the received user input, the client module 209 may receive the result corresponding to the received user input. The client module 209 may display the received result on the display module 204 and output the received result as an audio output through the speaker 205.

The client module 209 may receive a plan corresponding to the received user input. The client module 209 may display, on the display module 204, the results of executing a plurality of actions of an app according to the plan. For example, the client module 209 may sequentially display the results of executing the actions on the display module 204 and output the results in audio through the speaker 205. For another example, electronic device 201 may display only a result of executing a portion of the actions (e.g., a result of executing the last action) on the display module 204 and output the result in audio through the speaker 205.

The client module 209 may receive, from the intelligent server 200, a request for information required to calculate the result corresponding to the user input. The client module 209 may transmit the required information to the intelligent server 200 in response to the request.

The client module 209 may transmit information on the results of executing the actions according to the plan to the intelligent server 200. The intelligent server 200 may verify that the received user input has been correctly processed using the information.

The client module 209 may include a voice recognition module. The client module 209 may recognize a voice input for performing a limited function through the voice recognition module. For example, the client module 209 may execute an intelligent app for processing a voice input to perform an organic action through a set input (e.g., Wake up!).

The intelligent server 200 may receive information related to a user's voice input from the electronic device 201 through a communication network. The intelligent server 200 may change data related to the received voice input into text data. The intelligent server 200 may generate a plan for performing a task corresponding to the voice input based on the text data.

The plan may be generated by an artificial intelligence (AI) system. The AI system may be a rule-based system or a neural network-based system (e.g., a feedforward neural network (FNN) or a recurrent neural network (RNN)). In one or more examples, the AI system may be a combination thereof or another AI system. The plan may be selected from a set of predefined plans or may be generated in real time in response to a request from a user. For example, the AI system may select at least one plan from among a plurality of predefined plans.

The intelligent server 200 may transmit a result according to the generated plan to the electronic device 201 or transmit the generated plan to the electronic device 201. The electronic device 201 may display the result according to the plan on the display module 204. The electronic device 201 may display, on the display module 204, a result of executing an action according to the plan.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive a user input from the electronic device 201. The front end 210 may transmit a response corresponding to the user input.

The natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert a voice input received from the electronic device 201 into text data. The NLU module 223 may understand a user's intention (or intent herein) using the text data of the voice input. For example, the NLU module 223 may understand the user's intention by analyzing the content of a user input. For example, the NLU module 223 may understand the user's intent by performing a syntactic or semantic analysis on a user input in the form of text data. The NLU module 223 may understand semantics of a word extracted from the user input using a linguistic feature (e.g., a syntactic element) of a morpheme or phrase and determine the intent by matching the semantics of the word to the intent. The NLU module 223 may obtain intent information corresponding to a user's utterance. The intent information may be information indicating a user's intent that is determined through an analysis of text data. The intent information may be information indicating an operation or function the user desires to execute using a device.

The planner module 225 may generate a plan using the intent determined by the NLU module 223 and a parameter. The planner module 225 may determine a plurality of domains required to perform a task based on the determined intent. The planner module 225 may determine a plurality of actions included in each of the domains determined based on the intent. The planner module 225 may determine a parameter required to execute the determined actions or a resulting value output by the execution of the actions. The parameter and the resulting value may be defined as a concept of a predetermined form or class. In one or more examples, a concept may specify a parameter as well as an associated type or units of the parameter. Accordingly, a plan may include a plurality of actions and a plurality of concepts determined by a user's intent. The planner module 225 may determine a relationship between the actions and the concepts stepwise or hierarchically. For example, based on the concepts, the planner module 225 may determine an order of executing the actions determined based on the user's intent. For example, the planner module 225 may determine the order of executing the actions based on the parameter required for the execution of the actions and the result output by the execution of the actions. Accordingly, the planner module 225 may generate the plan including connection information (e.g., ontology) between the actions and the concepts. The planner module 225 may generate a plan using information stored in the capsule DB 230 that stores therein a set of relationships between concepts and actions.

The NLG module 227 may change predetermined information into a text form. The information changed into the text form may be provided in the form of an utterance in a natural language. The TTS module 229 may change the information in the text form into information in a voice or speech form.

According to an example embodiment, some or all of the functions of the natural language platform 220 may also be implemented in the electronic device 201.

The capsule DB 230 may store therein information associated with relationships between a plurality of concepts and a plurality of actions corresponding to a plurality of domains. A capsule described herein may include a plurality of action objects (or action information) and concept objects (or concept information) included in a plan. The capsule DB 230 may store a plurality of capsules in the form of a concept-action network (CAN). The capsules may be stored in a function registry included in the capsule DB 230.

The capsule DB 230 may include a strategy registry that stores therein strategy information required to determine a plan corresponding to a user input (e.g., a voice input). When there are a plurality of plans corresponding to the user input, the strategy information may include reference information for determining a single plan. The capsule DB 230 may include a follow-up registry that stores therein information associated with follow-up actions for suggesting a follow-up action to a user in a corresponding predetermined situation. The follow-up action may include, for example, a follow-up utterance (or a subsequent utterance herein). The capsule DB 230 may include a layout registry that stores therein layout information associated with a layout of information output through the electronic device 201. The capsule DB 230 may include a vocabulary registry that stores therein vocabulary information included in capsule information. The capsule DB 230 may include a dialog registry that stores therein information associated with a dialog (or an interaction) with a user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with a user. The developer tool may include a follow-up editor for activating a follow-up objective and editing a follow-up utterance that provides a hint. The follow-up objective may be determined based on a currently set objective, a user's preference, or an environmental condition. The capsule DB 230 may also be implemented in the electronic device 201.

The execution engine 240 may calculate a result using a generated plan. The end user interface 250 may transmit the calculated result to the electronic device 201. Accordingly, the electronic device 201 may receive the result and provide the received result to a user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and a processing rate (or efficiency) of the intelligent server 200.

The service server 300 may provide a preset service (e.g., food ordering or hotel reservation) to the electronic device 201. The service server 300 may be a server operated by a third party. The service server 300 may provide the intelligent server 200 with information to be used for generating a plan corresponding to a received user input. The provided information may be stored in the capsule DB 230. In addition, the service server 300 may provide the intelligent server 200 with resulting information according to the plan.

In the integrated intelligent system 20 described above, the electronic device 201 may provide various intelligent services to a user in response to a user input from the user. The user input may include, for example, an input made through a physical button, a touch input, or a voice input. The voice input may be a speech utterance that includes one or more voice commands/

The electronic device 201 may provide a voice or speech recognition service through an intelligent app, or a voice/speech recognition app, stored therein. When a services relies on voice recognition, the electronic device 201 may recognize a user utterance or a voice input received from a user through the microphone 206 and provide the user with a service corresponding to the recognized voice input.

The electronic device 201 may perform a predetermined action alone or together with the intelligent server 200 and/or the service server 300 based on the received voice input. For example, the electronic device 201 may execute an app corresponding to the received voice input and perform the action through the executed app. The recognition of the voice input may result in an application being opened and executed based on the voice input.

When the electronic device 201 provides the service together with the intelligent server 200 and/or the service server 300, the electronic device 201 may detect a user utterance using the microphone 206 and generate a signal or voice data corresponding to the detected user utterance. The electronic device 201 may transmit the voice data to the intelligent server 200 using the communication interface 202.

In response to the voice input received from the electronic device 201, the intelligent server 200 may generate a plan for performing a task corresponding to the voice input or a result of performing an action according to the plan. The plan may include, for example, a plurality of actions for performing the task corresponding to the voice input of the user, and a plurality of concepts related to the actions. One or more of the plurality of actions may be performed sequentially or in parallel. The concepts may define parameters input to the execution of the actions or resulting values output by the execution of the actions. The plan may include connection information (e.g., ontology) between the actions and the concepts. The connection information may be associated with parameters and/or data to execute a current action and prepare for a next action to be executed.

The electronic device 201 may receive a response using the communication interface 202. The electronic device 201 may output a voice signal generated in the electronic device 201 to the outside using the speaker 205, or output an image generated in the electronic device 201 to the outside using the display module 204.

Figure 3:
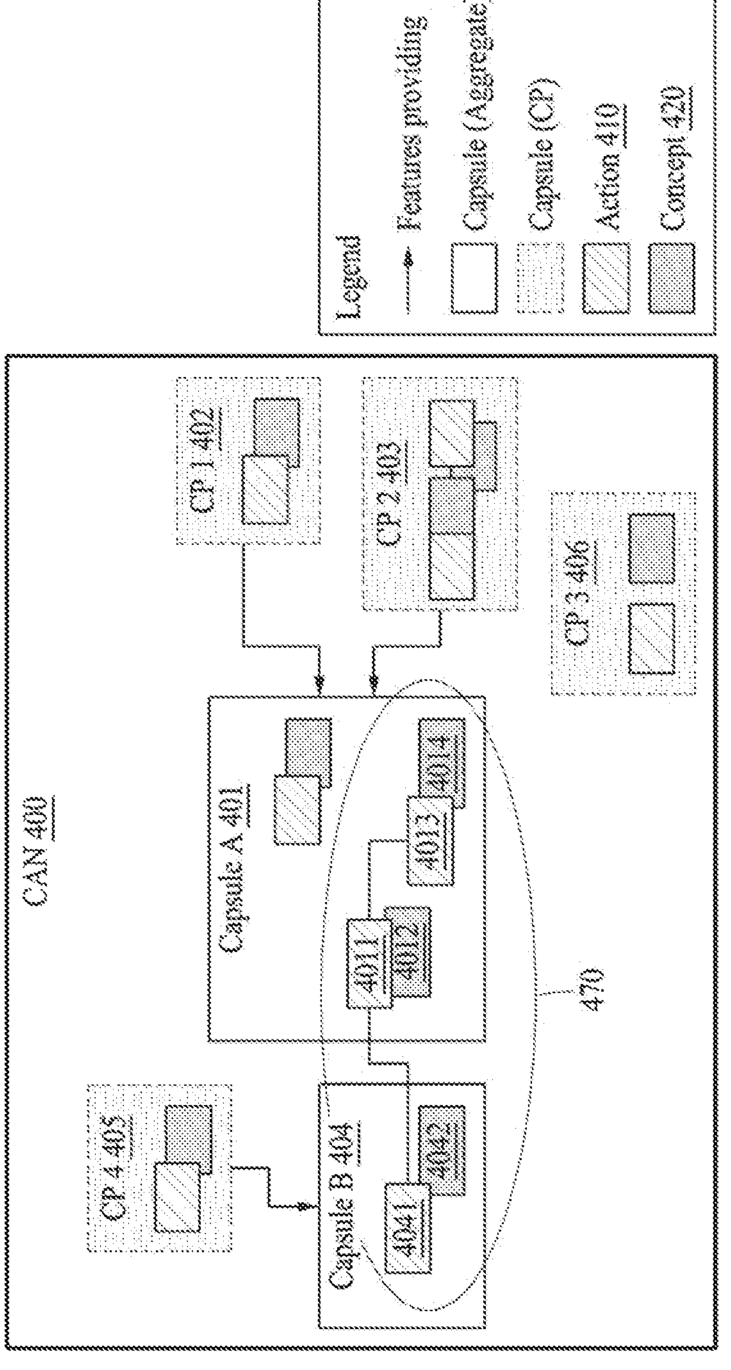
FIG. 3 is a diagram illustrating an example form in which concept and action relationship information is stored in a database (DB) according to an example embodiment of the present disclosure.

FIG. 3 is a diagram illustrating an example form in which concept and action relationship information is stored in a DB according to an example embodiment of the present disclosure.

A capsule DB (e.g., the capsule DB 230 of FIG. 2) of an intelligent server (e.g., the intelligent server 200 of FIG. 2) may store therein capsules in the form of a concept action network (CAN) 400. The capsule DB may store, in the form of the CAN 400, actions for processing a task corresponding to a voice input of a user and parameters necessary for the actions.

The capsule DB may store a plurality of capsules, for example, a capsule A 401 and a capsule B 404, respectively corresponding to a plurality of domains (e.g., apps). One capsule (e.g., the capsule A 401) may correspond to one domain (e.g., a location (geo) app). In addition, one capsule may correspond to at least one service provider (e.g., CP1 402 or CP2 403) for performing a function for a domain related to the capsule. One capsule may include at least one action 410 and at least one concept 420 for performing a preset function.

A natural language platform (e.g., the natural language platform 220 of FIG. 2) may generate a plan for performing a task corresponding to a received voice input using the capsules stored in the capsule DB. For example, a planner module (e.g., the planner module 225 of FIG. 2) of the natural language platform may generate the plan using the capsules stored in the capsule DB. For example, the planner module may generate a plan 470 using actions 4011 and 4013 and concepts 4012 and 4014 of the capsule A 401 and using an action 4041 and a concept 4042 of the capsule B 404.

Figure 4:
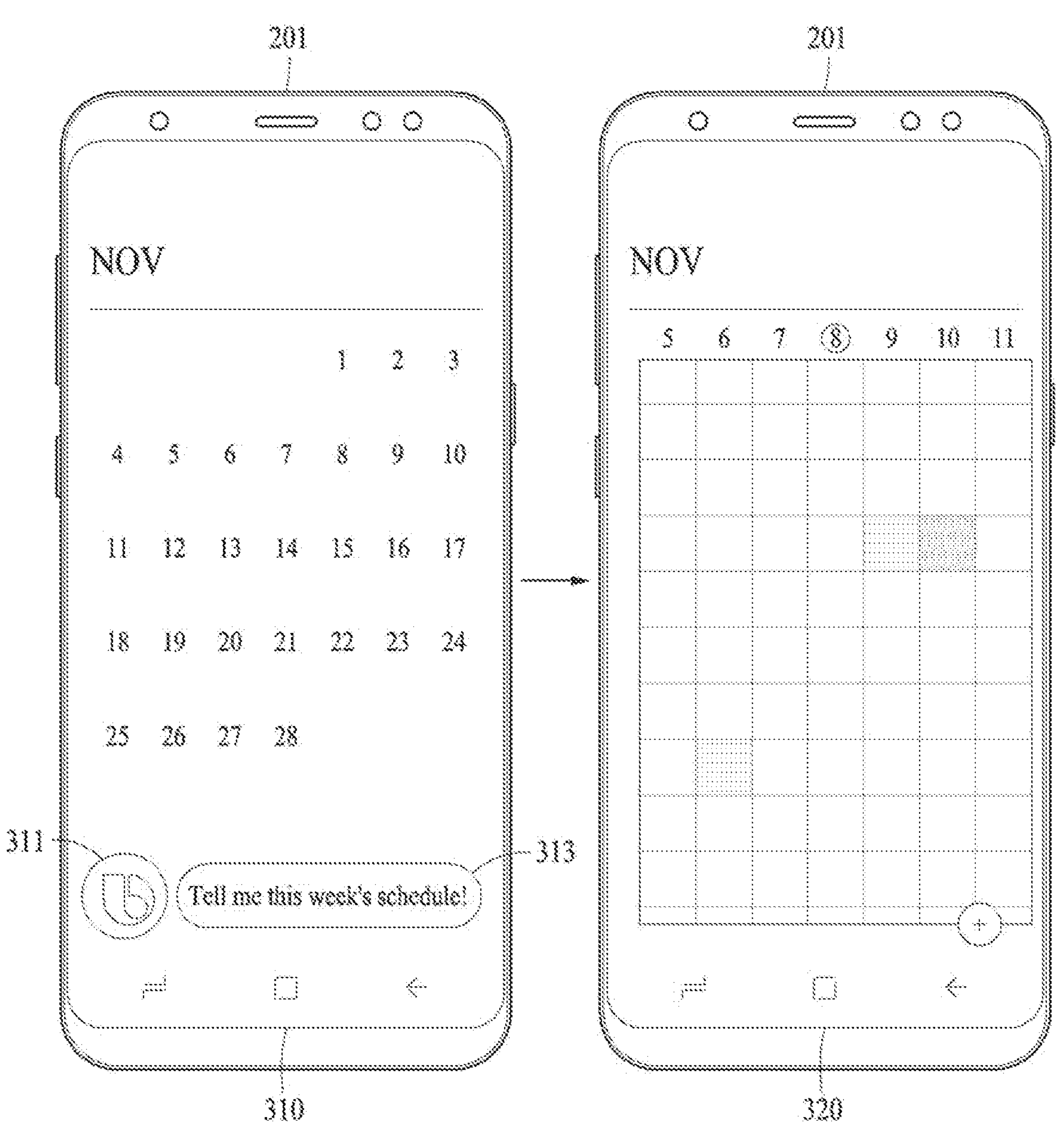
FIG. 4 is a diagram illustrating example screens showing an electronic device processing a received voice input via an intelligent application (app) according to an example embodiment of the present disclosure.

FIG. 4 is a diagram illustrating example screens showing an electronic device processing a received voice input through an intelligent app according to an example embodiment of the present disclosure.

The electronic device 201 may execute an intelligent app to process a user input through an intelligent server (e.g., the intelligent server 200 of FIG. 2).

According to an example embodiment, on screen 310, when recognizing a predetermined voice input (e.g., Wake up!) or receiving an input through a hardware key (e.g., a dedicated hardware key), the electronic device 201 may execute an intelligent app for processing the voice input. For example, the electronic device 201 may execute the intelligent app during the execution of a scheduling app. The electronic device 201 may display an object (e.g., an icon) 311 corresponding to the intelligent app on a display module (e.g., the display module 204 of FIG. 2). The electronic device 201 may receive the voice input corresponding to a user's utterance. For example, the electronic device 201 may receive a voice input "Tell me this week's schedule!." The electronic device 201 may display, on the display module 204, a user interface (UI) 313 (e.g., an input window) of the intelligent app on which text data of the received voice input is displayed. The UI 313 may display a recognized command that correlates with the voice input. For example, if the user utters "schedule" or utters "I want to see the schedule this week," the UI 313 may display "Tell me this week's schedule."

On screen 320, the electronic device 201 may display, on the display module 204, a result corresponding to the received voice input. For example, the electronic device 201 may receive a plan corresponding to the received user input and display, on the display module 204, "this week's schedule" according to the plan.

Figure 5:
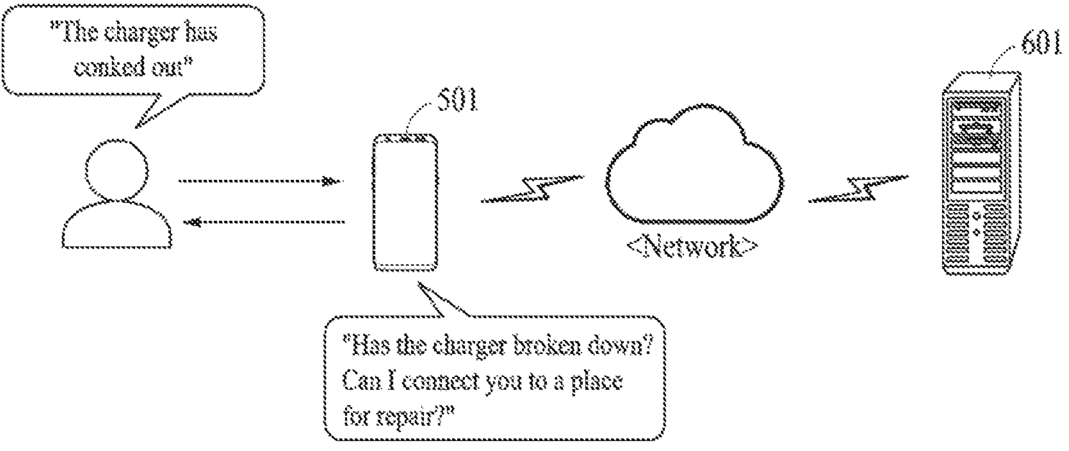
FIG. 5 is a diagram illustrating an example operation of processing a user's utterance by an electronic device according to an example embodiment of the present disclosure.

FIG. 5 is a diagram illustrating an example operation of processing a user's utterance by an electronic device according to an example embodiment of the present disclosure.

Referring to FIG. 5, according to an example embodiment, an electronic device 501 may include at least some of the components of the electronic device 101 described above with reference to FIG. 1 and the electronic device 201 described above with reference to FIG. 2. An intelligent server 601 may include one or more of the components of the intelligent server 200 described above with reference to FIG. 2. A description of the electronic device 501 and the intelligent server 601 of FIG. 5, which has been already provided above with reference to FIGS. 1 to 4, will not be repeated.

The electronic device 501 (e.g., the electronic device 101 of FIG. 1 or the electronic device 201 of FIG. 2) and the intelligent server 601 (e.g., the intelligent server 200 of FIG. 2) may be connected via a local area network (LAN), a wide area network (WAN), a value-added network (VAN), a mobile radio communication network, a satellite communication network, or a combination thereof. The electronic device 501 and the intelligent server 601 may communicate with each other using a wired communication method or a wireless communication method (e.g., wireless LAN (Wi-Fi), Bluetooth, Bluetooth low energy (BLE), ZigBee, Wi-Fi Direct (WFD)), ultra-wideband (UWB), infrared communication (e.g., infrared data association (IrDA)), or near-field communication (NFC)).

According to an example embodiment, the electronic device 501 may be implemented as at least one of a smartphone, a tablet personal computer (PC), a mobile phone, a speaker (e.g., an AI speaker), a video phone, an e-book reader, a desktop PC, a netbook computer, a workstation, a server, a personal digital assistant (PDA), a portable multimedia player (PMP), an MP3 player, a mobile medical device, a camera, or a wearable device.

According to an example embodiment, the electronic device 501 may obtain a voice signal corresponding to a user's utterance and transmit the voice signal to the intelligent server 601. The intelligent server 601 may obtain text data corresponding to the user's utterance based on the voice signal. The text data may be obtained as a voice (or speech) portion is converted into a computer-readable text through automatic speech recognition (ASR) performed on the voice signal. The intelligent server 601 may analyze the user's utterance using the text data. The intelligent server 601 may use a result of the analyzing (e.g., a domain (or capsule), intent information, and/or a slot) to provide a device (e.g., the electronic device 501) with a response (e.g., a question and answer) to be provided to a user. The intelligent server 601 may be implemented in software. One or more of the functions of the intelligent server 601 may be implemented in the electronic device 501 and/or the intelligent server 601 (e.g., the intelligent server 200 of FIG. 2). For example, on-device AI for processing an utterance without communication with the intelligent server 601 may be included in the electronic device 501. The natural language platform 220 and the like described above with reference to FIGS. 2 to 4 may be implemented in the electronic device 501. One or more of the operations performed by the intelligent server 601 may be performed by the electronic device 501 and/or the intelligent server 601. The following description will be provided on the premise that the operations are performed by the electronic device 501.

According to an example embodiment, the electronic device 501 may determine a user's intent from the user's utterance and perform a task corresponding to the user's utterance. The electronic device 501 may analyze the user's utterance using the text data (e.g., the user's utterance converted into the form of text data). The electronic device 501 may provide the response to the user using the result of the analyzing (e.g., a domain (or capsule), intent information, and/or a slot). The domain may be an area or category associated with an operation or function the user desires to execute using a device (e.g., the electronic device 501). In one or more examples, domains (e.g., applications) may be classified according to text-related services. The domain may be associated with the user's intent. The intent information may be information representing the user's intent determined by analyzing the text data. The intent information may include information indicating an operation or function the user intends to execute using the device. The slot may be detailed information associated with the intent information. The slot may be variable information required to perform an operation. For example, the variable information included in the slot may include a named entity. For example, if a text converted from the user's utterance is "play music on the Melon application," the domain may be "music (Melon)," the intent information may correspond to a user's intent to "play music content," and the slot may be the "Melon application." As illustrated in this example, the domain is associated with an application.

According to an example embodiment, the electronic device 501 may transform an utterance or a speech including a non-processable word that is not processable by the electronic device 501 into an utterance including a processable word that is processable by the electronic device 501. The utterance including a non-processable word may be an utterance that is not analyzable by the electronic device 501. The utterance including a non-processable word may also be an utterance with which a user's intent is not able to be determined. The utterance including a non-processable word may also be an utterance with which a domain (e.g., an app)

required to perform a task based on a user's intent is not able to be determined. In one or more examples, a non-processable word may be a unrecognized word.

Referring to FIG. 5, according to an example embodiment, the electronic device 501 may receive an utterance (e.g., "The charger has conked out"). The utterance may include a non-processable word (e.g., "conked"). The electronic device 501 may transform the utterance including the non-processable word (e.g., "conked") into an utterance (e.g., "Has the charger broken down?") including a word (e.g., "broken") that is transformed by the electronic device 501 such that the transformed word may be processed. The electronic device 501 may provide the user with a response (e.g., "Has the charger broken down? Can I connect you to a place for repair?") corresponding to the utterance (e.g., "The charger has conked out") based on the utterance (e.g., "Has the charger broken down?") including the transformed word.

According to an example embodiment, the electronic device 501 may support utterances (e.g., utterances including non-processable words) that have not been supported by the intelligent server 601 (e.g., the intelligent server 200 of FIG. 2). The electronic device 501 may not need to retrain an NLU module (e.g., the NLU module 223 of FIG. 2) with non-processable words to support utterances including the non-processable words. The electronic device 501 may support utterances including non-processable words without retraining the NLU module 223, thereby reducing the complexity of a natural language platform (e.g., the natural language platform 220 of FIG. 2).

Figure 6:
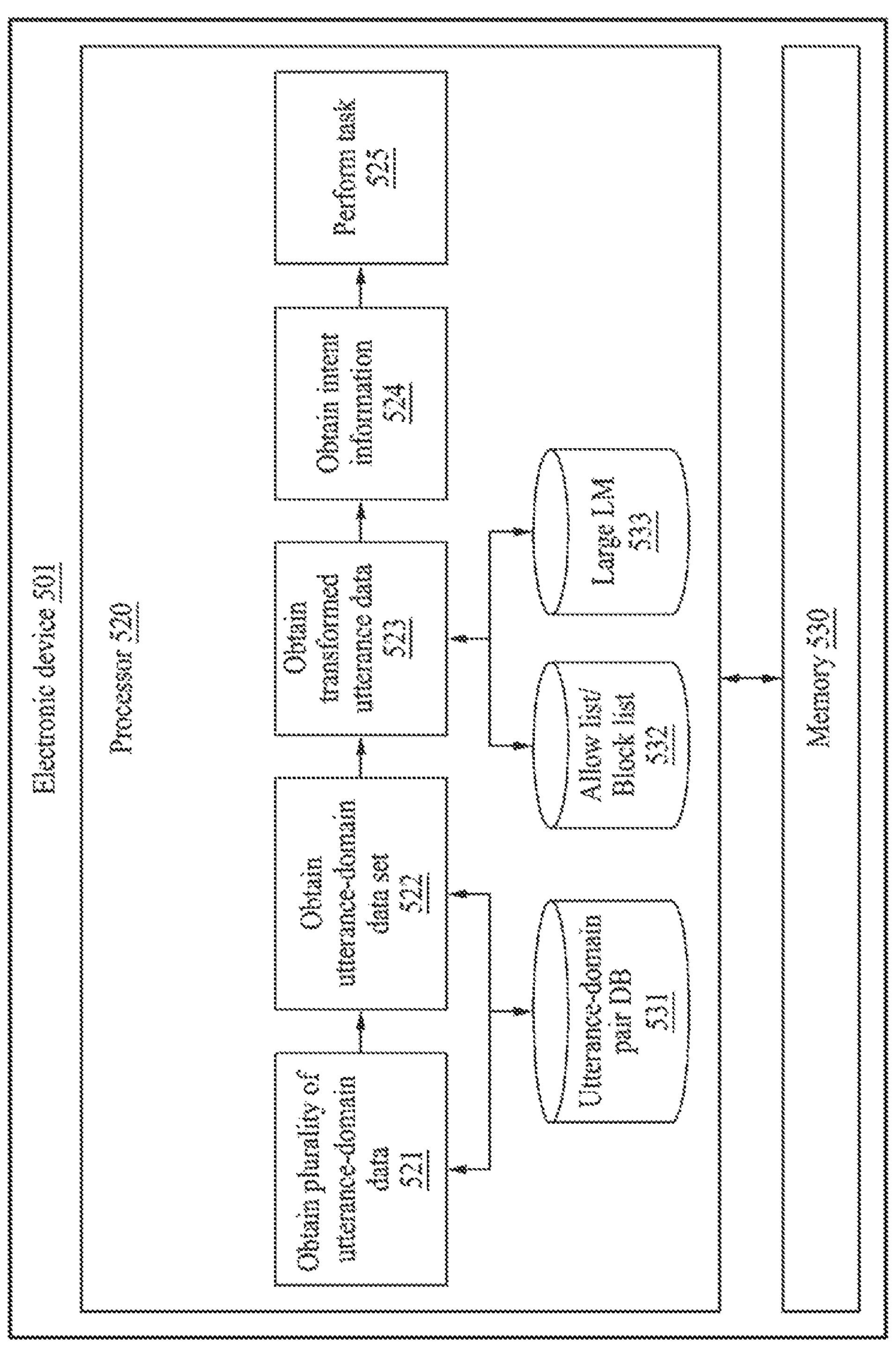
FIG. 6 is a block diagram illustrating an example electronic device according to an example embodiment of the present disclosure.

FIG. 6 is a block diagram illustrating an example electronic device according to an example embodiment of the present disclosure.

Referring to FIG. 6, according to an example embodiment, an electronic device 501 of FIG. 5 may include at least some of the components of the electronic device 101 described above with reference to FIG. 1 and the electronic device 201 described above with reference to FIG. 2. As described above, on-device AI configured to process utterances without communication with an intelligent server (e.g., the intelligent server 200 of FIG. 2 or the intelligent server 601 of FIG. 5) may be provided in the electronic device 501. The natural language platform 220 described above with reference to FIGS. 2 to 4 may be implemented in the electronic device 501. A description of the electronic device 501, which has been already provided above with reference to FIGS. 1 to 4, will not be repeated. The electronic device 501 may include a processor 520 (e.g., the processor 120 of FIG. 1 or the processor 203 of FIG. 2), and a memory 530 (e.g., the memory 130 of FIG. 1 or the memory 207 of FIG. 2) electrically connected to the processor 520. The processor 520 (e.g., an application processor) may access the memory 530 to execute instructions. The processor 520 may perform operations to provide a response to a user. The memory 530 may store various data used by at least one component (e.g., the processor 520) of the electronic device 501.

According to an example embodiment, operations 521 to 525 may be construed as being performed by the processor 520 of the electronic device 501. The operations to be described below may be performed in sequential order but not be necessarily performed in sequential order. For example, the operations may be performed in different orders, and at least two of the operations may be performed in parallel.

According to an example embodiment, in operation 521, the processor 520 may obtain a plurality of utterance-domain data. The utterance-domain data may be data in which candidate utterance data and a domain in which the candidate utterance data is to be processed are paired with each other. The candidate utterance data may include a similar or associated word, or a substantially identical word, to a word (e.g., a processable word) included in user utterance data. The candidate utterance data may include a word (e.g., a processable word) obtained by transforming a word (e.g., a non-processable word) included in the user utterance data to word that is processable or recognized.

According to an example embodiment, the processor 520 may preprocess the user utterance data. The processor 520 may remove or transform unnecessary components (e.g., swear words, typos, nongrammatical sentences, etc.) included in the user utterance data. The processor 520 may determine whether the user utterance data includes a non-processable word. The processor 520 may preprocess the user utterance data including the non-processable word to be comparable to the utterance-domain data.

According to an example embodiment, the processor 520 may obtain a plurality of utterance-domain data including a word obtained by transforming a word included in preprocessed user utterance data. Based on an utterance-domain pair DB 531, the processor 520 may obtain a plurality of utterance-domain data including a similar or associated word to a word included in the user utterance data and/or a word obtained by transforming a word included in the user utterance data. For example, through a principal component analysis, the processor 520 may obtain the plurality of utterance-domain data that is based on the user utterance data.

According to an example embodiment, in operation 522, the processor 520 may obtain an utterance-domain data set. The processor 520 may construct the utterance-domain data set from the plurality of utterance-domain data based on a set per-domain candidate utterance data ratio, which may be a set ratio of candidate utterance data for each domain. The utterance-domain data set may be constructed from the plurality of utterance-domain data by a contrastive sampling method. The operation of constructing the utterance-domain data set will be described in detail below with reference to FIG. 7. The processor 520 may verify the utterance-domain data set. In one or more examples, when the utterance-domain data set is not suitable for generating transformed utterance data, the processor 520 may discard the utterance-domain data set.

According to an example embodiment, in operation 523, the processor 520 may generate transformed utterance data. The transformed utterance data may be paired with a domain in which the transformed utterance data is processed. The processor 520 may preprocess the utterance-domain data set based on lists 532. For example, utterance-domain data included in a block list may be removed from the utterance-domain data set. For example, the utterance-domain data set may be reconstructed only with utterance-domain data included in an allow list. The processor 520 may generate the transformed utterance data associated with the user utterance data by inputting a result of the preprocessing to a language model 533. The language model 533 may be used as a prompt method. The prompt method may be a method that is used to extract similar rules and utterances by using examples of a certain size as inputs to use a language model. For example, the prompt method may be a method of inputting an input (e.g., sparrow: bird, goose: bird, leopard: not a bird, eagle: ?) into a language model and obtaining an output (e.g., eagle: bird). The processor 520 may efficiently use the language model 533 by using the utterance-domain data set including candidate utterance data paired with various domains. The processor 520 may verify the transformed utterance data. The processor 520 may verify the transformed utterance data by using a threshold value for determining whether the transformed utterance data is suitably generated.

According to an example embodiment, in operation 524, the processor 520 may obtain intent information corresponding to the transformed utterance data. The intent information may refer to information indicating a user's intent that is determined through an analysis of text data. For example, a user's utterance may be converted to text, where a semantical analysis is performed on the text to determine an intent (e.g., retrieve data, open a particular application, etc.). The intent information may include information indicating an operation or function the user intends to execute using a device. The processor 520 may also obtain the intent information based on information (e.g., domain) paired with the transformed utterance data. The processor 520 may determine the user's intent, using the transformed utterance data instead of the user utterance data. In one or more examples, the user's intent determined based on the domain may have higher priority than a user's intent determined based on the user's utterance. In one or more examples, the user's intent determined based on domain may have lower priority than a user's intent determined based on the user's utterance.

According to an example embodiment, in operation 525, the processor 520 may perform a task corresponding to the intent information. The processor 520 may provide a response to the user in response to the intent information.

Figure 7:
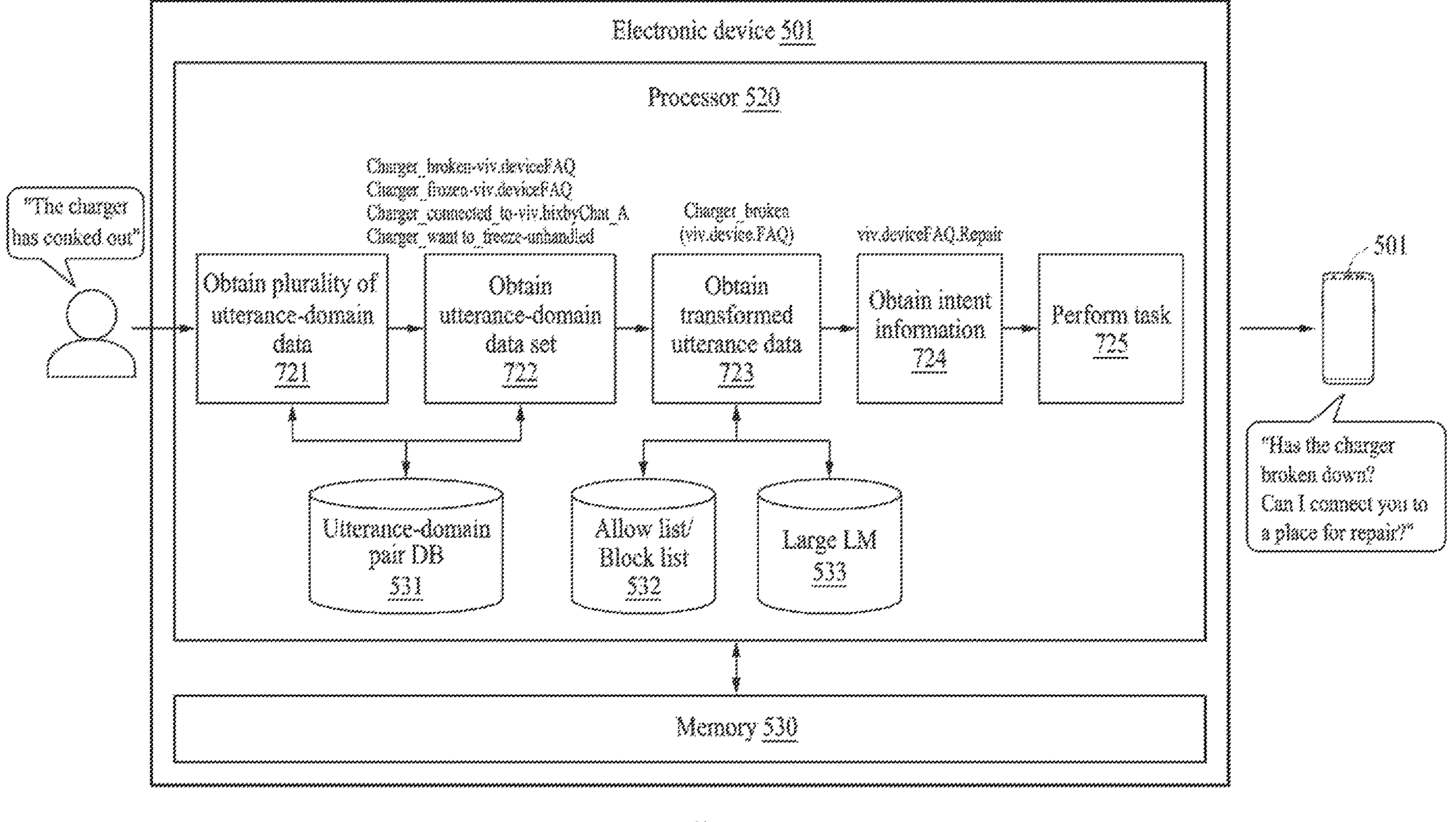
FIG. 7 is a diagram illustrating an example operation of processing a user's utterance by an electronic device according to an example embodiment of the present disclosure.

FIG. 7 is a diagram illustrating an example operation of processing a user's utterance by an electronic device according to an example embodiment of the present disclosure.

According to an example embodiment, operations 721 to 725 may be construed as being performed by the processor 520 of the electronic device 501. The operations to be described below may be performed in sequential order but not be necessarily performed in sequential order. For example, the operations may be performed in different orders. In one or more examples at least two of the operations may be performed in parallel.

According to an example embodiment, in operation 721, the processor 520 may obtain a plurality of utterance-domain data (e.g., charger_broken-viv.deviceFAQ). The utterance-domain data (e.g., charger_broken-viv.deviceFAQ) may be data in which candidate utterance data (e.g., charger_broken) and a domain (e.g., viv.deviceFAQ) in which the candidate utterance data is to be processed are paired with each other. For example, the candidate utterance data (e.g., charger_broken) may include a similar or substantially identical word (e.g., "charger") to a word (e.g., a processable word such as "charger") included in user utterance data (e.g., "The charger has conked out"). The candidate utterance data (e.g., charger_broken) may include a transformed word (e.g., a processable word such as "broken") that is transformed from a word (e.g., a non-processable word such as "conked") included in the user utterance data (e.g., "The charger has conked out"). Although the candidate utterance data includes the transformed word in operation 721, examples are not limited thereto. For example, the candidate utterance data may include a transformed phrase and/or sentence other than the transformed word. According to an example embodiment, in operation 722, the processor 520 may obtain an utterance-domain data set (e.g., charger_broken-viv.deviceFAQ, charger_frozen-viv.deviceFAQ, charger_connected_to-viv.bixbyChat_A, and charger_want to_freeze_unhandled). The processor 520 may construct the utterance-domain data set from the plurality of utterance-domain data based on a set per-domain candidate utterance data ratio (e.g., 2:1:1). The utterance-domain data set may be constructed from the plurality of utterance-domain data for a contrastive sampling method. The utterance-domain data set (e.g. charger_broken-viv.deviceFAQ, charger_frozen-viv.deviceFAQ, charger_connected_to_viv.bixbyChat_A, charger_want_to_freeze_unhandled) may include similar utterance data (e.g., charger_broken and charger_frozen), boundary utterance data (e.g., charger_connected_to), and/or opposite utterance data (e.g., charger_want_to_freeze), respectively. The similar utterance data (e.g., charger_broken and charger_frozen) may be candidate utterance data paired with a domain (e.g., viv.deviceFAQ) occupying the highest ratio among the plurality of candidate utterance data. The boundary utterance data (e.g., charger_connected_to) may be candidate utterance data paired with a domain (e.g., viv.bixbyChat_A) occupying a moderate ratio among the plurality of candidate utterance data. The opposite utterance data (e.g., charger_want_to_freeze) may be candidate utterance data paired with a domain (e.g., unhandled) occupying the lowest ratio among the plurality of candidate utterance data. For example, the opposite utterance may correspond to utterance data that is least likely to be associated with a user's utterance.

According to an example embodiment, the per-domain candidate utterance data ratio included in the utterance-domain data set may be predefined. For example, a ratio among similar utterance data:boundary utterance data:opposite utterance data may be predefined as 7:2:1. As understood by one of ordinary skill in the art, these ratios are merely exemplary, and may include desired ratio configuration between the similar utterance data, boundary utterance data, and opposite utterance data. The per-domain candidate utterance data ratio included in the utterance-domain data set may be set based on characteristics of the user utterance data. For example, when the user utterance data corresponds to a successive utterance, a ratio of the similar utterance data may be set to be higher than those of other utterance data. For example, when the user utterance data includes a plurality of sentences, respective ratios of the boundary utterance data and the opposite utterance data may be set to be relatively high.

According to an example embodiment, in operation 723, the processor 520 may generate transformed utterance data (e.g., charger_broken (viv.deviceFAQ)). The transformed utterance data (e.g., charger_broken (viv.deviceFAQ)) may be paired with a domain (e.g., viv.deviceFAQ) in which the transformed utterance data contains one or more processable words. The processor 520 may input the utterance-domain data set to the language model 533 to generate the transformed utterance data (e.g., charger_broken (viv.deviceFAQ)) associated with the user utterance data (e.g., "The charger has conked out"). The language model 533 may be used as a prompt method. The processor 520 may efficiently use the language model 533 by using the utterance-domain data set (e.g., charger_broken-viv.deviceFAQ, charger_frozen-viv.deviceFAQ, charger_connected_to-viv.bixbyChat_A, and charger_want to_freeze-unhandled) including candidate utterance data paired with various domains (e.g., viv.deviceFAQ, viv.bixbyChat_A, and unhandled).

According to an example embodiment, the processor 520 may not construct the utterance-domain data set only with the similar utterance data. In one or more examples, the processor 520 may efficiently use the language model 533 through the prompt method such that the utterance-domain data set includes the boundary utterance data and the opposite utterance data in addition to the similar utterance data.

According to an example embodiment, in operation 724, the processor 520 may obtain intent information (e.g., viv.deviceFAQ.Repair) corresponding to the transformed utterance data. The intent information may be information indicating a user's intent that is determined through an analysis of text data. The intent information may include information indicating an operation or function the user intends to execute using a device. The processor 520 may obtain the intent information (e.g., viv.deviceFAQ.Repair) based on information (e.g., domain information) (e.g., viv.deviceFAQ) paired with the transformed utterance data (e.g., charger_broken (viv.deviceFAQ)). The processor 520 may determine the user's intent using the transformed utterance data (e.g., charger_broken (viv.deviceFAQ)) instead of the user utterance data (e.g., "The charger has conked out").

According to an example embodiment, in operation 725, the processor 520 may perform a task corresponding to the intent information (e.g., viv.deviceFAQ.Repair). The processor 520 may provide the user with a response (e.g., "Has the charger broken down? Can I connect you to a place for repair?"). The response may be based on the transformed utterance data.

Figure 8:
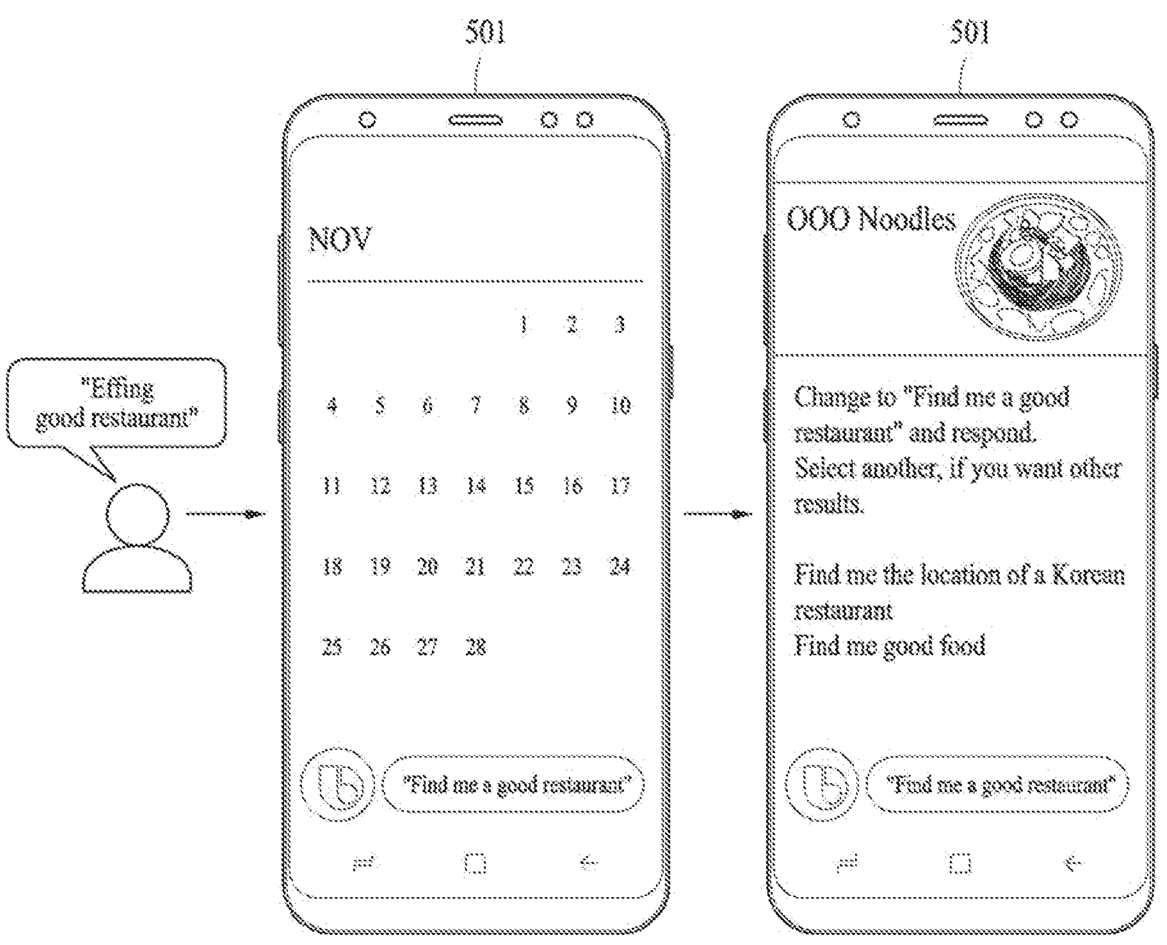
FIG. 8 is a diagram illustrating an example result of processing a user's utterance by an electronic device according to an example embodiment of the present disclosure.

FIG. 8 is a diagram illustrating an example result of processing a user's utterance by an electronic device according to an example embodiment of the present disclosure.

Referring to FIG. 8, according to an example embodiment, the electronic device 501 may receive an utterance (e.g., "effing good restaurant"). The utterance may include a non-processable word (e.g., "effing good"). The electronic device 501 may transform the utterance including the non-processable word (e.g., "effing good") into an utterance (e.g., "Find me a good restaurant") including a word (e.g., "good restaurant") that is transformed to process the utterance including the non-processable word. The electronic device 501 may provide a response (e.g., a restaurant search result) corresponding to the utterance (e.g., "effing good restaurant") based on the utterance (e.g., "Find me a good restaurant") including the transformed word.

According to an example embodiment, the electronic device 501 may input an utterance-domain data set into a language model (e.g., the language model 533 of FIG. 6) and generate transformed utterance data (e.g., "Find me a good restaurant") associated with user utterance data (e.g., "effing good restaurant"). In one or more examples, the electronic device 501 may not construct the utterance-domain data set only with similar utterance data (e.g., "Fine me a good restaurant" and "Find me a Korean restaurant"). The electronic device 501 may construct the utterance-domain data set such that it includes boundary utterance data (e.g., "Find me good food") and opposite utterance data (e.g., "When is the first nuclear bomb") in addition to the similar utterance data, thereby effectively using the language model through a prompt method.

According to an example embodiment, the electronic device 501 may additionally display an utterance (e.g., "Find me the location of a Korean restaurant" and "Find me good food") including a word (e.g., Korean restaurant and good food) that is transformed to allow the electronic device 501 to process the non-processable word (e.g., "effing good"). The electronic device 501 may additionally display the utterance including the transformed word to accurately determine a user's intent.

Figure 9:
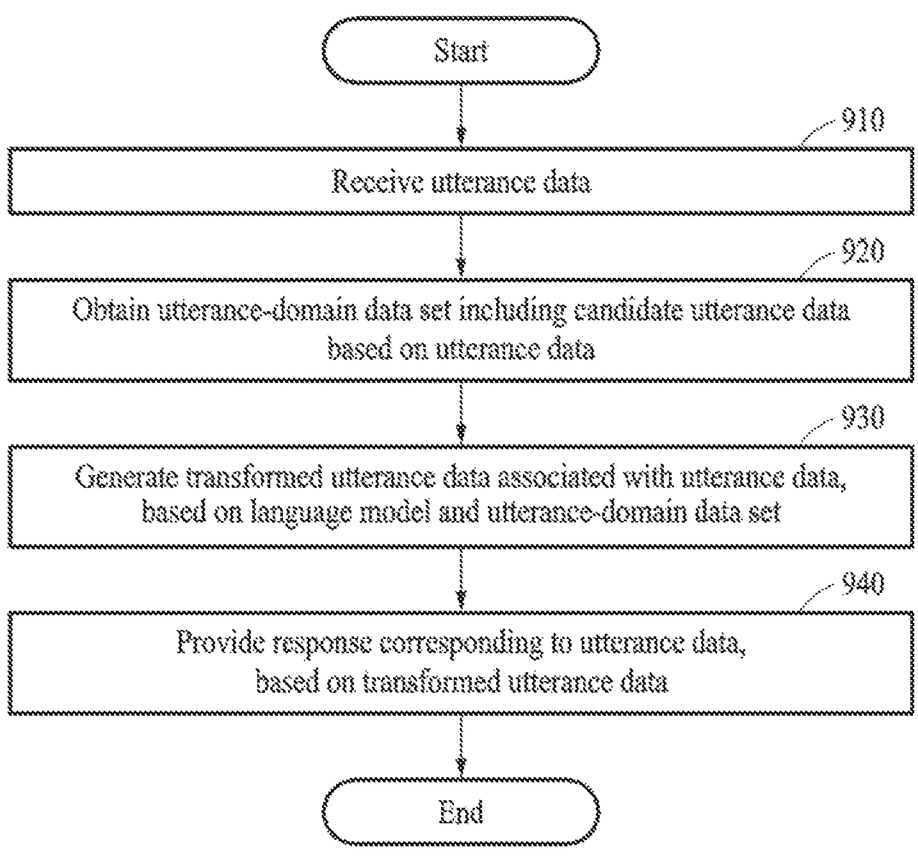
FIG. 9 is a flowchart illustrating an example operation method of an electronic device according to an example embodiment of the present disclosure.

FIG. 9 is a flowchart illustrating an example operation method of an electronic device according to an example embodiment of the present disclosure.

Operations 910 to 940 may be performed in sequential order. However, as understood by one of ordinary skill in the art, these operations may not be necessarily performed in sequential order. For example, operations 910 to 940 may be performed in different orders, and at least two of the operations may be performed in parallel.

In operation 910, a processor (e.g., the processor 520 of FIG. 6) may receive user utterance data. The user utterance data may be voice data corresponding to a user speaking into a microphone of a device.

In operation 920, the processor 520 may obtain an utterance-domain data set including candidate utterance data based on the user utterance data. The candidate utterance data may include a word obtained by transforming a word included in the user utterance data.

In operation 930, the processor 520 may generate transformed utterance data associated with the user utterance data based on a language model and the utterance-domain data set. In one or more examples, operation 930 may be performed based on a determination that the user utterance data includes at least one non-processable or unrecognizable word. A per-domain candidate utterance data ratio of candidate utterance data for each domain included in the utterance-domain data set may be predefined or set based on characteristics of the user utterance data. The language model may be used through a prompt method. The transformed utterance data may be paired with a domain in which the transformed utterance data is processed.

In operation 940, the processor 520 may provide a response corresponding to the user utterance data based on the transformed utterance data. The processor 520 may obtain intent information corresponding to the transformed utterance data. In addition, the processor 520 may obtain the intent information based on information paired with the transformed utterance data. The processor 520 may perform a task corresponding to the intent information.

According to an example embodiment, an electronic device (e.g., the electronic device 101 of FIG. 1, the electronic device 201 of FIG. 2, or the electronic device 501 of FIGS. 5 and 6) may include a memory (e.g., the memory 130 of FIG. 1, the memory 207 of FIG. 2, or the memory 530 of FIG. 6) including instructions and a processor (e.g., the processor 120 of FIG. 1, the processor 203 of FIG. 2, or the processor 520 of FIG. 6) electrically connected to the memory and configured to execute the instructions. When the instructions are executed by the processor, the processor may perform a plurality of operations, and the plurality of operations may include receiving user utterance data. The plurality of operations may include obtaining an utterance-domain data set including candidate utterance data that is based on the user utterance data. The plurality of operations may include generating transformed utterance data associated with the user utterance data based on a language model and the utterance-domain data set. The plurality of operations may include providing a response corresponding to the user utterance data based on the transformed utterance data. The utterance-domain data set may include at least one candidate utterance data paired with each of a plurality of domains.

According to an example embodiment, the candidate utterance data may include a transformed word that is obtained by transforming a word included in the user utterance data.

According to an example embodiment, a per-domain candidate utterance data ratio of candidate utterance data for each domain included in the utterance-domain data set may be predefined or set based on characteristics of the user utterance data.

According to an example embodiment, the language model may be used through a prompt method.

According to an example embodiment, the obtaining of the utterance-domain data set may include preprocessing the user utterance data. The obtaining of the utterance-domain data set may include obtaining a plurality of utterance-domain data including a word obtained by transforming a word included in the preprocessed user utterance data.

According to an example embodiment, the obtaining of the utterance-domain data set may include constructing the utterance-domain data set from the plurality of utterance-domain data based on the set per-domain candidate utterance data ratio. The obtaining of the utterance-domain data set may include verifying the utterance-domain data set.

According to an example embodiment, the generating of the transformed utterance data may include preprocessing the utterance-domain data set based on lists. The generating of the transformed utterance data may include generating the transformed utterance data associated with the user utterance data by inputting a result of the preprocessing to the language model.

According to an example embodiment, the providing of the response may include obtaining intent information corresponding to the transformed utterance data. The providing of the response may include performing a task corresponding to the intent information.

According to an example embodiment, the transformed utterance data may be paired with a domain in which the transformed utterance data is processed.

According to an example embodiment, the providing of the response may include obtaining the intent information based on information paired with the transformed utterance data. The providing of the response may include performing the task corresponding to the intent information.

According to an example embodiment, an operation method of an electronic device (e.g., the electronic device 101 of FIG. 1, the electronic device 201 of FIG. 2, or the electronic device 501 of FIGS. 5 and 6) may include receiving user utterance data. The operation method of the electronic device may include obtaining an utterance-domain data set including candidate utterance data that is based on the user utterance data. The operation method of the electronic device may include generating transformed utterance data associated with the user utterance data based on a language model and the utterance-domain data set. The operation method of the electronic device may include providing a response corresponding to the user utterance data based on the transformed utterance data. The utterance-domain data set may include at least one candidate utterance data paired with each of a plurality of domains.

According to an example embodiment, the candidate utterance data may include a transformed that is obtained by transforming a word included in the user utterance data.

According to an example embodiment, a per-domain candidate utterance data ratio of candidate utterance data for each domain that is included in the utterance-domain data set may be predefined or set based on characteristics of the user utterance data.

According to an example embodiment, the language model may be used through a prompt method.

According to an example embodiment, the obtaining of the utterance-domain data set may include preprocessing the user utterance data. The obtaining of the utterance-domain data set may include obtaining a plurality of utterance-domain data including a word obtained by transforming a word included in the preprocessed user utterance data.

According to an example embodiment, the obtaining of the utterance-domain data set may include constructing the utterance-domain data set from the plurality of utterance-domain data based on the set per-domain candidate utterance data ratio. The obtaining of the utterance-domain data set may include verifying the utterance-domain data set.

According to an example embodiment, the generating of the transformed utterance data may include preprocessing the utterance-domain data set based on lists. The generating of the transformed utterance data may include generating the transformed utterance data associated with the user utterance data by inputting a result of the preprocessing to the language model.

According to an example embodiment, the providing of the response may include obtaining intent information corresponding to the transformed utterance data. The providing of the response may include performing a task corresponding to the intent information.

According to an example embodiment, the transformed utterance data may be data in which the transformed utterance data and a domain in which the transformed utterance data is processed are paired with each other.

According to an example embodiment, the providing of the response may include obtaining the intent information based on information paired with the transformed utterance data. The providing of the response may include performing the task corresponding to the intent information.

According to various embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the examples described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Terms such as "first," "second," or "initial" or "next" or "subsequent" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a complier or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, a method according to an example embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

memory storing instructions; and at least one processor, wherein the instructions, when executed by the at least one processor individually or collectively, cause the electronic device to:

receive user utterance data;

obtain an utterance-domain data set comprising candidate utterance data that is based on the user utterance data;

generate transformed utterance data associated with the user utterance data based on a language model and the utterance-domain data set; and provide a response corresponding to the user utterance data, based on the transformed utterance data, wherein the utterance-domain data set comprises a first candidate utterance data paired with a first domain of a plurality of domains and a second candidate utterance data paired with a second domain of the plurality of domains, the first candidate utterance data comprises a first word, and the second candidate utterance data comprises a second word that is different from the first word, and wherein each domain of the plurality of domains corresponds to a different operation or function.

2. The electronic device of claim 1, wherein the candidate utterance data comprises a word obtained by transforming a word comprised in the user utterance data.

3. The electronic device of claim 1, wherein a per-domain candidate utterance data ratio of candidate utterance data for each domain comprised in the utterance-domain data set is defined in advance or set based on a characteristic of the user utterance data.

4. The electronic device of claim 1, wherein the language model is used in a form of a prompt.

5. The electronic device of claim 1, wherein the instructions, when executed by the at least one processor individually or collectively, cause the electronic device to obtain the utterance-domain data set by:

preprocessing the user utterance data, the preprocessing including a removal or modification of at least one word included in the user utterance data; and obtaining a plurality of utterance-domain data comprising a word obtained by transforming a word comprised in the preprocessed user utterance data.

6. The electronic device of claim 5, wherein the instructions, when executed by the at least one processor individually or collectively, cause the electronic device to obtain the utterance-domain data set by:

constructing the utterance-domain data set from the plurality of utterance-domain data based on a set per-domain candidate utterance data ratio; and verifying the utterance-domain data set.

7. The electronic device of claim 1, wherein the instructions, when executed by the at least one processor individually or collectively, cause the electronic device to generate the transformed utterance data by:

preprocessing the utterance-domain data set based on one or more lists; and generating the transformed utterance data associated with the user utterance data by inputting a result of the preprocessing into the language model.

8. The electronic device of claim 1, wherein the instructions, when executed by the at least one processor individually or collectively, cause the electronic device to provide the response by:

obtaining intent information corresponding to the transformed utterance data; and performing a task corresponding to the intent information.

9. The electronic device of claim 1, wherein the transformed utterance data is data in which the transformed utterance data and a domain from the plurality of domains in which the transformed utterance data is processed are paired with each other.

10. The electronic device of claim 1, wherein the instructions, when executed by the at least one processor individually or collectively, cause the electronic device to provide the response by:

obtaining intent information based on information paired with the transformed utterance data; and performing a task corresponding to the intent information.

11. The electronic device according to claim 1, wherein the candidate utterance data comprises a word obtained by transforming a word comprised in the user utterance data, and wherein the word comprised in the user utterance data is a non-supported or unrecognized word, and the word in the candidate utterance data is supported or recognized after transforming the word comprised in the user utterance data.

12. An operation method of an electronic device, the operation method comprising:

receiving user utterance data;

obtaining an utterance-domain data set comprising candidate utterance data that is based on the user utterance data;

generating transformed utterance data associated with the user utterance data based on a language model and the utterance-domain data set; and providing a response corresponding to the user utterance data based on the transformed utterance data, wherein the utterance-domain data set comprises a first candidate utterance data paired with a first domain of a plurality of domains and a second candidate utterance data paired with a second domain of the plurality of domains, the first candidate utterance data comprises a first word, and the second candidate utterance data comprises a second word that is different from the first word, and wherein each domain of the plurality of domains corresponds to a different operation or function.

13. The operation method of claim 12, wherein the candidate utterance data comprises a word obtained by transforming a word comprised in the user utterance data.

14. The operation method of claim 12, wherein a per-domain candidate utterance data ratio of candidate utterance data for each domain comprised in the utterance-domain data set is defined in advance or set based on a characteristic of the user utterance data.

15. The operation method of claim 12, wherein the obtaining of the utterance-domain data set comprises:

preprocessing the user utterance data, the preprocessing including a removal or modification of at least one word included in the user utterance data; and obtaining a plurality of utterance-domain data comprising a word obtained by transforming a word comprised in the preprocessed user utterance data.

16. The operation method of claim 15, wherein the obtaining of the utterance-domain data set comprises:

constructing the utterance-domain data set from the plurality of utterance-domain data based on a set per-domain candidate utterance data ratio; and verifying the utterance-domain data set.

17. The operation method of claim 12, wherein the generating of the transformed utterance data comprises:

preprocessing the utterance-domain data set based on one or more lists; and generating the transformed utterance data associated with the user utterance data by inputting a result of the preprocessing into the language model.

18. The operation method of claim 12, wherein the providing of the response comprises:

obtaining intent information corresponding to the transformed utterance data; and performing a task corresponding to the intent information.

19. The operation method of claim 12, wherein the providing of the response comprises:

obtaining intent information based on information paired with the transformed utterance data; and performing a task corresponding to the intent information.

* * * * *